US006944911B2

(12) United States Patent
Knoblauch

(10) Patent No.: US 6,944,911 B2
(45) Date of Patent: Sep. 20, 2005

(54) BALANCE HANDLE

(75) Inventor: David L. Knoblauch, 1325 Laurel St., Broomfield, CO (US) 80020

(73) Assignee: David L. Knoblauch, Broomfield, CO (US)

( * ) Notice: Subject to any disclaimer, the term of this patent is extended or adjusted under 35 U.S.C. 154(b) by 0 days.

(21) Appl. No.: 10/396,248

(22) Filed: Mar. 26, 2003

(65) Prior Publication Data

US 2004/0187255 A1 Sep. 30, 2004

(51) Int. Cl.[7] .................................................. A45F 5/10

(52) U.S. Cl. .......................... 16/114.1; 16/425; 16/422; 16/DIG. 25; 294/31.2; 294/154; 294/170

(58) Field of Search .......................... 16/422, 426, 436, 16/444, 114.1, DIG. 41, 406, 443, 446, DIG. 28, DIG. 25, DIG. 12, DIG. 19, 425; 294/31.2, 170, 149–151, 153–157, 165, 137; 224/922, 148.2; 206/142

(56) References Cited

U.S. PATENT DOCUMENTS 85,129 A * 12/1868 Porter ........................ 294/154
303,896 A * 8/1884 Tharp ......................... 294/154
1,175,024 A * 3/1916 Thorson ..................... 294/154
2,524,639 A * 10/1950 Saunders .................... 294/154
2,919,017 A * 12/1959 Weber ........................... 43/26
2,973,989 A * 3/1961 Harwood ................... 294/31.2
2,978,154 A * 4/1961 Kaitey ........................ 294/154
3,073,493 A * 1/1963 Pfaffenberger .............. 294/154
3,794,370 A * 2/1974 Lockhart et al. ........... 294/31.2
4,556,245 A * 12/1985 Gruenwald ................ 294/31.2
4,612,909 A * 9/1986 Lee ........................ 126/299 D
4,656,566 A * 4/1987 Kelley ........................ 362/202
4,724,989 A * 2/1988 Silberberg .................. 224/609
4,791,702 A * 12/1988 McVey ........................ 16/428
5,549,339 A * 8/1996 Frean ........................ 294/31.2
5,853,213 A * 12/1998 Simpson ..................... 294/158
6,637,242 B2 * 10/2003 Masters ......................... 70/16
2003/0184103 A1 * 10/2003 Cauchy ..................... 294/27.1
2004/0004367 A1 * 1/2004 Main et al. ................. 294/150

* cited by examiner

*Primary Examiner*—Chuck Y. Mah
*Assistant Examiner*—Michael J. Kyle

(57) ABSTRACT

A Balance Handle includes two types of handle grips, A type having braided rope approximately five and one-half inches long inserted and centered within a length of comparable diameter tubular nylon webbing and B type, a commonly available product consisting of approximately six inch length of heavy rubber tubing inserted and centered within a length of comparable tubular nylon webbing covered with a molded, non-marking rubber sleeve. Two case clamps are stainless steel worm gear clamps, each cut to a length slightly longer than the diameter of a tubular fishing rod case and sheathed in comparably sized tubular nylon webbing of a length approximately one inch shorter than the diameter of the tubular fishing rod case. Both A type and B type handle grip ends are void of rope or tubing and thus flat, enabling them to be cut to a length at least long enough to fit under, up, and over the worm gear housing of the case clamp. Each end of both A type and B type handle grip is squarely melted forming a small T shape. Each end of either A type or B type handle grip is fitted under a case clamp, each of which encircles the tubular fishing case, and this assembly—the Balance Handle—is positioned over the tubular fishing rod case weight fulcrum and secured in place by tightening the actual worm gear.

7 Claims, 10 Drawing Sheets

BALANCE HANDLE

CROSS REFERENCES

| | | | |
|---|---|---|---|
| 4696842 | September, 1987 | Doubt | 428/41.3 |
| 6148483 | June, 1993 | DeGraff | 16/430 |
| 5319874 | June, 1994 | Vance | 43/26 |
| 5960950 | October, 1999 | Meeker, et al. | 206/315.11 |
| 6241090 | January, 2000 | Kaplinsky | 206/315.11 |

BACKGROUND OF THE INVENTION

The invention relates to a Balance Handle for transporting fishing rods and the like in tubular cases, and in particular, balancing the load of such transport for comfort and safety.

A fishing rod, for example, may be constructed of a solid, tubular, or hexagonal length of material such as bamboo, fiberglass, graphite, or boron. Alternatively, the rod may be comprised of detachable sections. When the rod is transported to a fishing area, a tubular case is often used to protect the relatively fragile fishing rod. While most of these cases are of a round shape, others are oval, square, triangular, hexagonal and the like. Some cases provide a permanently attached carrying handle. The handle is often one inch nylon webbing sewn to the covering material of the fishing case. However, no fishing cases currently exist with a carrying handle which may be positioned to balance the horizontal weight of the case for either one handed horizontal carry.

All fishing cases which have a handle come with the handle permanently attached to a predetermined location chosen by the manufacturer. This unadjustable handle cannot compensate for varying rod weights. For example, when compared to a carried suitcase, the fishing rod case has a greater horizontal carrying length (often seven feet and sometimes longer) and a fraction of the vertical depth. Thus, if the fulcrum of the case is only one inch different from the center of the handle, gravity pulls one end of the fishing case downward. Since a single fishing case designed to carry various rod types and thus, weights, the difference between the fulcrum of the case and the center of the handle is typically rather more than one inch. Therefor, the person carrying the case by the handle will either let one end of case slide on grade or lift the case higher to avoid such contact. Since a case may be used while getting into and out of boats, checking baggage for travel, or simply hiking to ocean, lake or river; physical discomfort as well as safety issues are a realistic concern. This situation is remedied by refitting preexisting cases with the balance handle or by manufacturing new cases with the Balance Handle.

BRIEF SUMMARY OF THE INVENTION

The invention is a Balance Handle used for carrying a fishing rod(s) in a tubular fishing rod case, horizontally balancing the combined weight of the fishing rod(s) and tubular case for carry in one hand. The Balance Handle consists of a handle grip secured by two case clamps. Two handle grip designs are used. One design is a length of tubular webbing filled in the middle with braided rope (handle grip A type) and the other is a length of tubular webbing filled in the middle with heavy rubber tubing and then covered on the outside with a molded, non-marking sleeve; this composite assembly is a commonly available product. The handle grip A type is for lighter tubular rod cases and the handle grip B type is for heavy tubular rod cases. The case clamps are commonly available stainless steel worm gear clamps cut to length and then sheathed in tubular nylon webbing. The sheathing on the case clamps protects both the handle grip and the tubular rod case and provides a smooth, steady slide for repositioning the Balance Handle. Moreover, it allows the handle to be repositioned by only slightly loosening the worm gear and, thus, maintaining enough tension to hold the handle grip in place. Both case clamps attach around the tubular rod case. The handle grip fits in between and perpendicular to the case clamps. The two flat handle grip ends rest between the tubular rod case and the case clamps. This arrangement of handle grip and case clamps—the Balance Handle—is then centered on the tubular rod case weight fulcrum and, when so positioned, secured in place by tightening the case clamps. The Balance Handle thus balances the weight of tubular cases for horizontal carry.

DETAILED DESCRIPTION OF THE INVENTION

Figure 1:
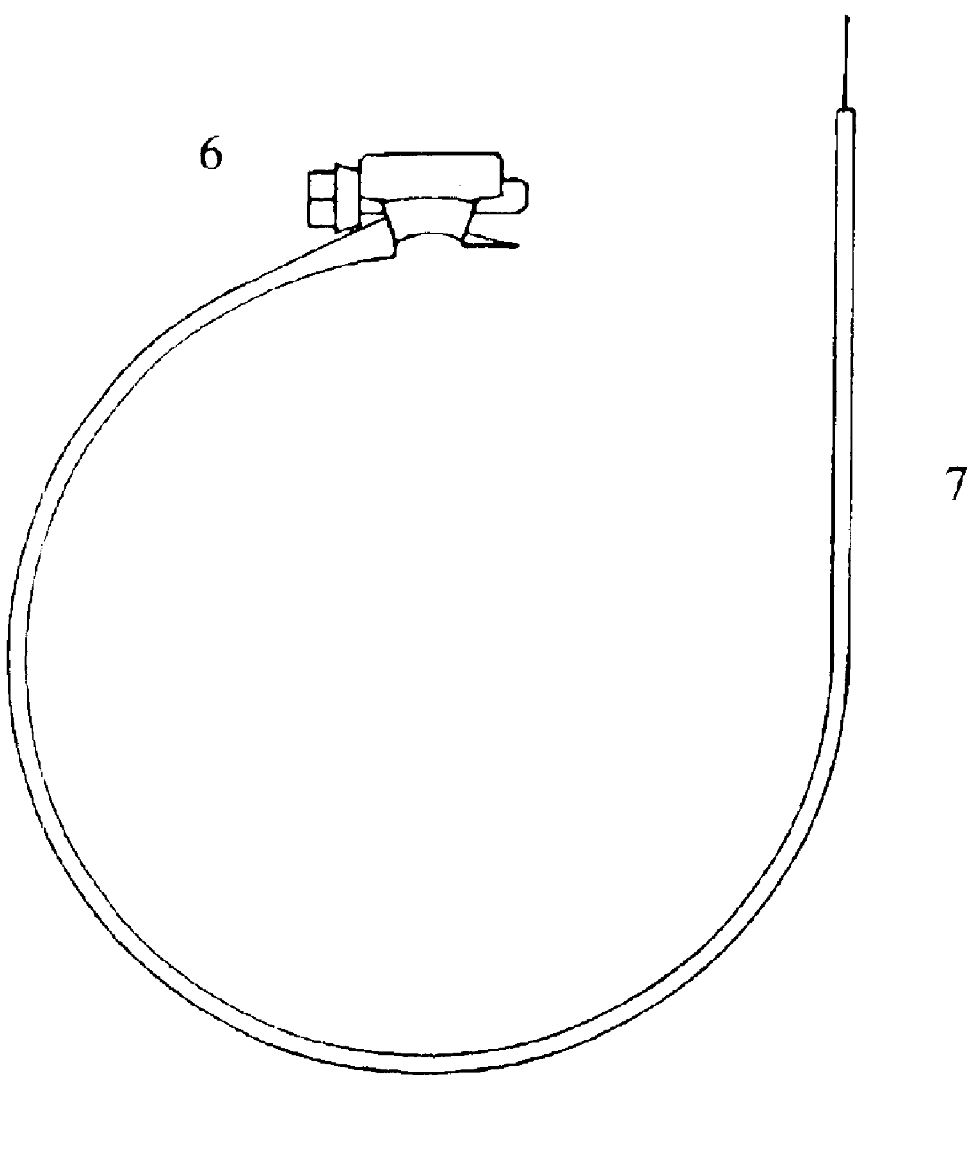
FIG. 1 is an end view of a case clamp with an exposed or "tag" end of the stainless steel worm gear clamp and the exposed foot of the worm gear mechanism.
Figure 2:
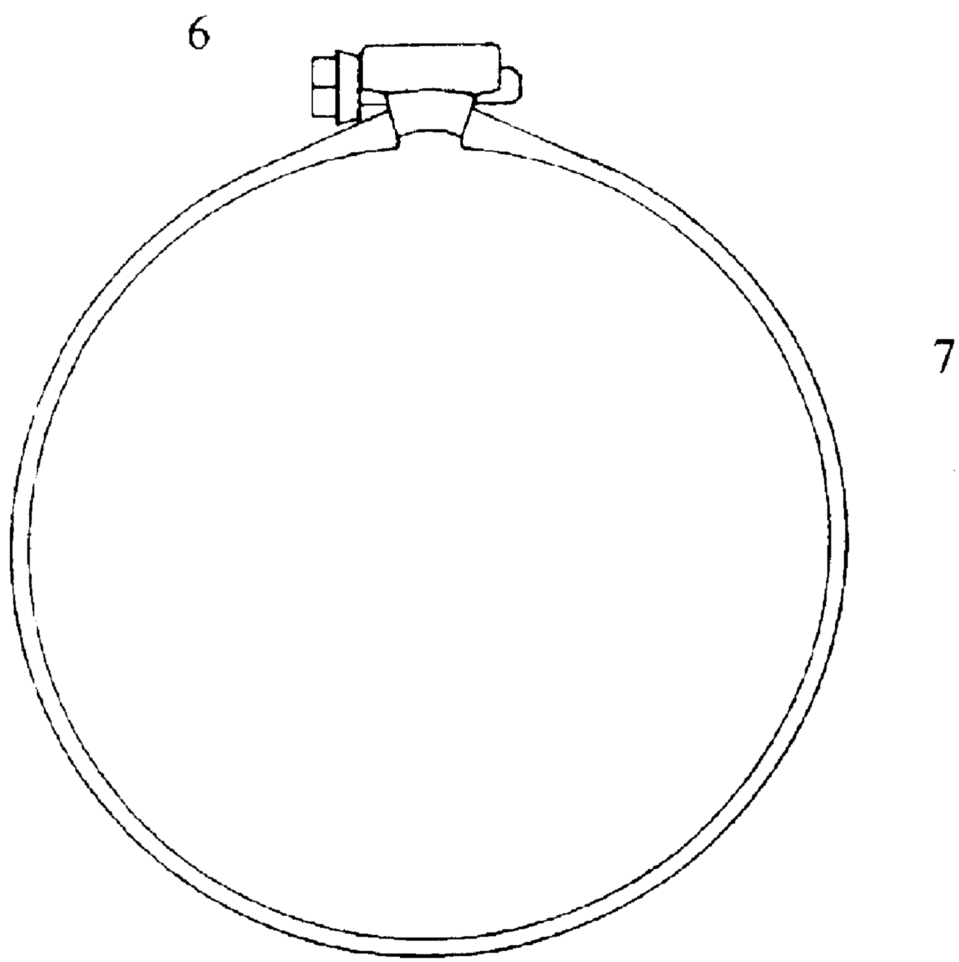
FIG. 2 is an end view of an assembled case clamp.
Figure 3:
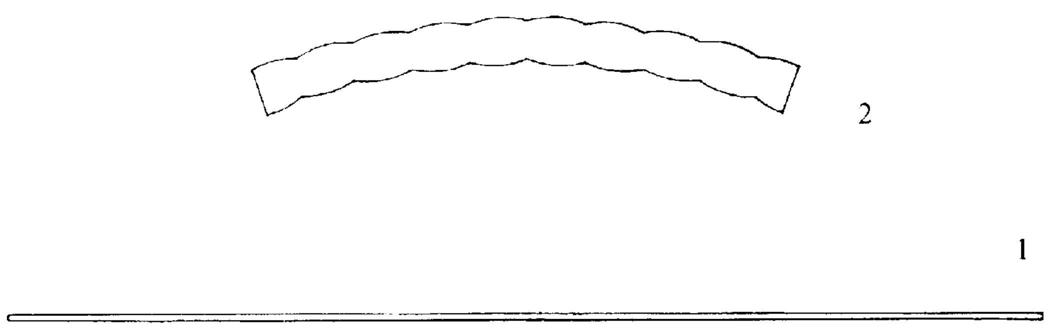
FIG. 3 is a frontal view of A type handle grip components.
Figure 4:
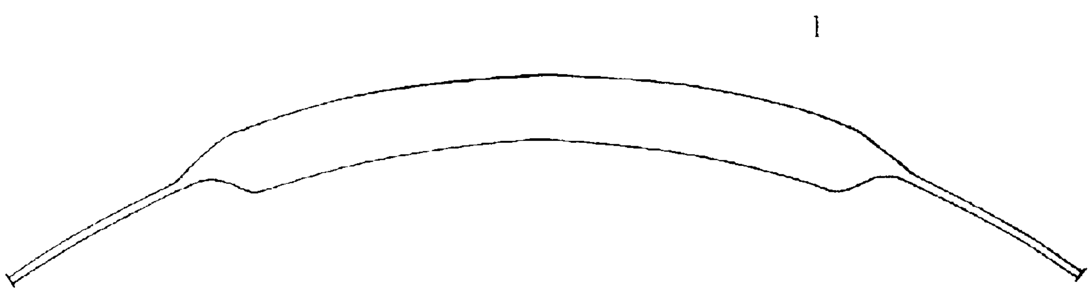
FIG. 4 is a frontal view of an assembled A type handle grip.
Figure 5:
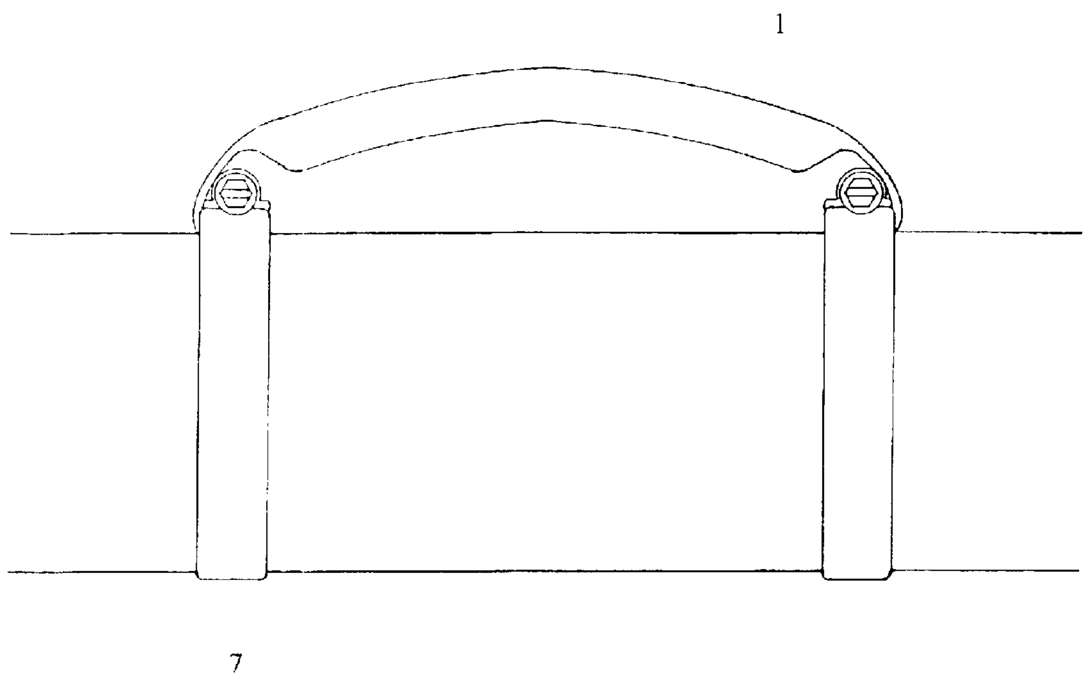
FIG. 5 is a frontal view of a Balance Handle, A type, mounted on a three inch PVC tube.
Figure 7:
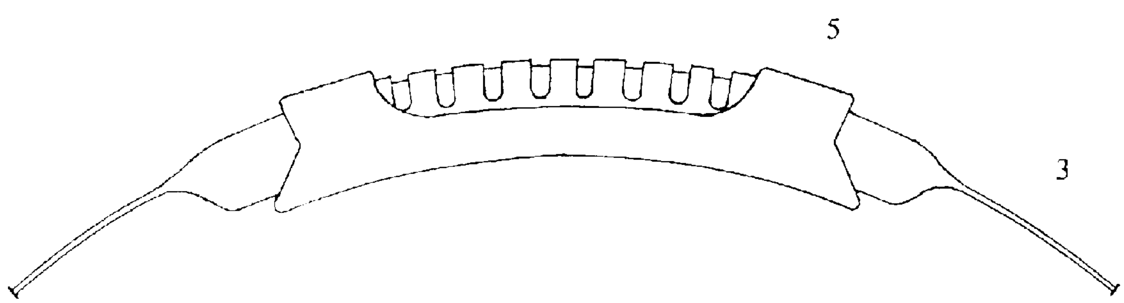
FIG. 7 is a frontal view of an assembled B type handle grip.
Figure 8:
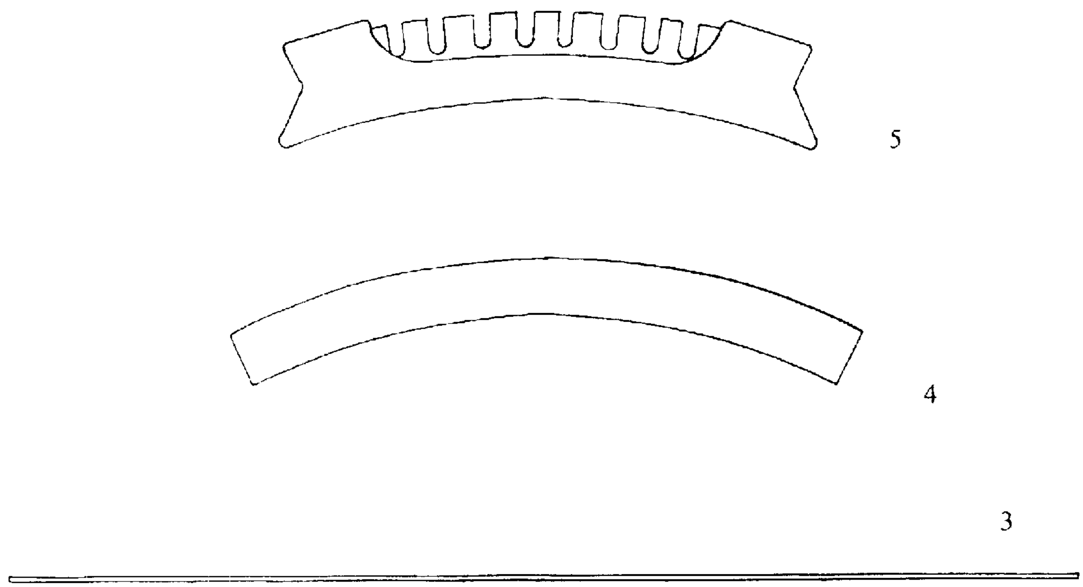
FIG. 8 is a frontal view of B type handle grip components.
Figure 9:
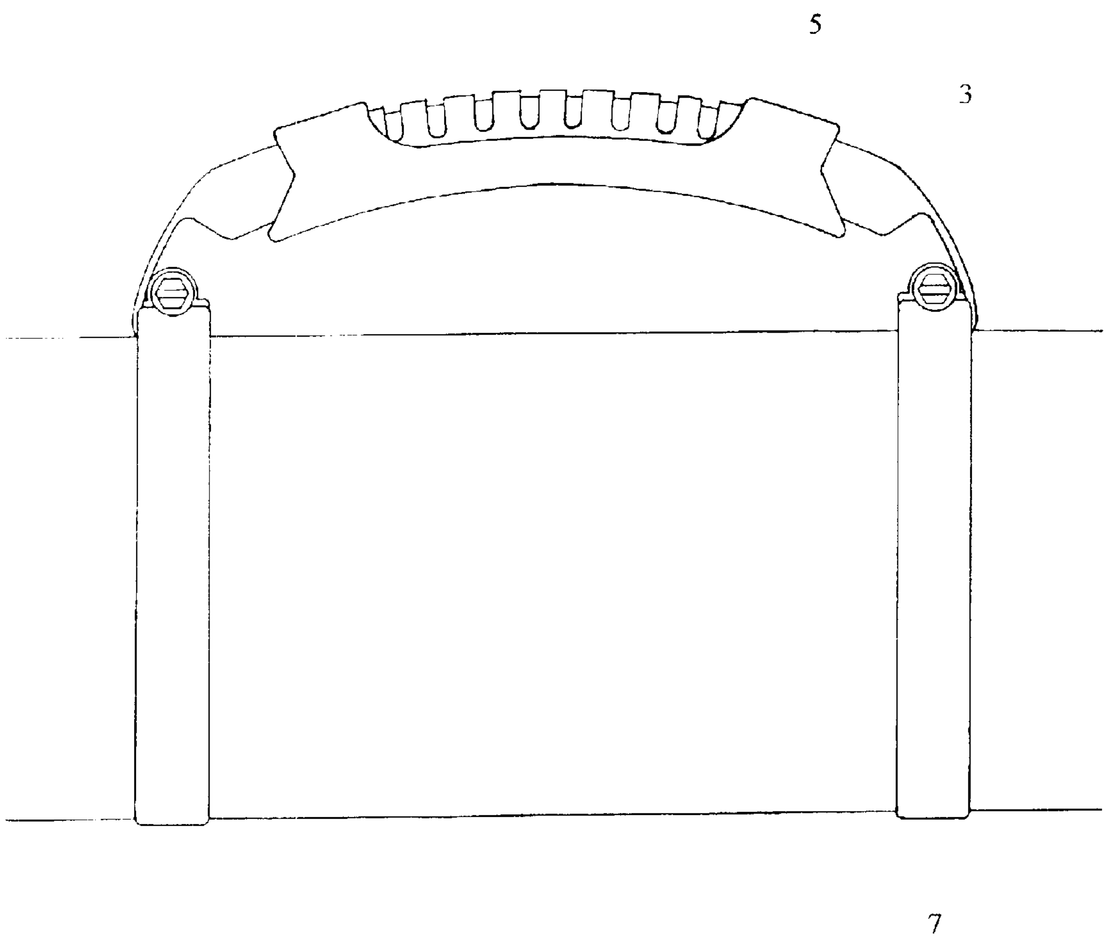
FIG. 9 is a frontal view of a Balance Handle, B type, mounted on a four inch PVC tube.

In accordance with the invention, generally stated, the invention is a Balance Handle, as shown in FIG. 5 and FIG. 9, used for carrying a fishing rod(s) in a tubular rod case, horizontally balancing the combined weight of the fishing rod(s) and tubular rod case in one hand;

the provision of such a Balance Handle as shown in FIG. 5 to be in part comprised of a nine to ten inch piece of one inch tubular nylon webbing, 1 in FIG. 3, with a five inch and one-half inch section of five-eights inch braided rope, 2 in FIG. 3, inserted and centered within the one inch tubular nylon, with each end of the tubular nylon then perpendicularly melted forming an end at least one eighth of an inch wide, thus forming a handle grip A type shown in FIG. 4 and, alternately, the Balance Handle in FIG. 9 to be in part a ten inch length of one inch tubular nylon webbing, 3 in FIG. 8, filled with a six inch section of five-eights heavy rubber tubing, 4 in FIG. 8, inserted and centered in the one inch tubular webbing then covered with a molded, non-marking rubber, 5 in FIG. 8, with the one inch tubular ends melted perpendicular as in FIG. 4, forming handle grip B type shown in FIG. 7, with handle grip A type in FIG. 4 being for shorter or lighter tubular cases—such as 1½, 2, and 2½ polyvinyl chloride or PVC—and handle grip B type in FIG. 7 being for longer or heavier tubular rod cases such as 3, 4, 5, and 6 inch PVC;

the provision of such a Balance Handle shown in FIG. 5 and FIG. 9 to be in part two identical case clamps comprised of a pair of common stainless steel worm gear clamps which are cut to a length approximately one inch longer than the circumference of the tubular case, 6 in FIG. 1, and flat tubular webbing which is cut approximately three-eights of an inch shorter than the cut length of the stainless steel worm gear clamps, 7 in FIG. 1, with the flat tubular webbing sheathing all of the band section of the stainless steel worm gear clamps except approximately one half inch of the tag end shown in FIG. 1, with the "tag" end then inserted into the worm gear, and then turning the worm gear clockwise for approximately one revolution clockwise in order to engage the worm gear mechanism as shown in FIG. 2;

the provision of such a Balance Handle as in FIG. 5 and FIG. 9 comprised of each handle grip end, for handle grip A type shown in FIG. 4 and handle grip B type as shown in FIG. FIG. 7, which is not occupied by rope or tubing and thus flat, to be of sufficient length to make a wrap perpendicular to a case clamp, FIG. 2, starting with and fully covering the under side the worm gear housing, up the side of the worm gear housing, and over the top of the worm gear housing as in FIG. 5 and FIG. 9;

the provision of such a Balance Handle to be comprised of a handle grip for handle grip A type as in FIG. 4 and B type as in FIG. 7 laid parallel to the tubular case and of two identical case clamps, one of which is shown in FIG. 2, positioned around the circumference of the tubular case with each end of the handle grip, shown in FIG. 4 and FIG. 7, turned 180 degrees and so positioned to rest between the tubular case and a case clamp worm gear housing as shown in FIG. 5 and FIG. 9;

the provision of such a Balance Handle as in FIG. 5 and FIG. 9 to be positioned when the fulcrum of the combined weight of the object to be transported and tubular case is aligned within the longitudinal center of the balance handle;

the provision of such a Balance Handle to be secured by tightening the case clamps as shown in FIG. 5 and FIG. 9 with a regular screwdriver, a coin or token, a five-sixteenth wrench or a five-sixteenth socket and matching drive tool;

the provision of such a Balance Handle tubular webbing components 7, 1, 3, to be of any color or pattern so offered by any manufacturer;

the provision of such a Balance Handle stainless steel worm gear clamps 6 in FIG. 1 and FIG. 2 to be anodized, blued, or powder coated or the like;

the provision of such a Balance Handle case clamps in FIG. 2 to both conform to and protect various tubular case materials such as PVC, Schedule 40, aluminum, wood or other synthetic or natural materials in round, oval, square, triangular, hexagonal and the like shapes;

the provision of such a Balance Handle as in FIG. 5 and FIG. 9 to allow changes in form and detail without departing from the spirit and scope of the invention.

DETAILED DESCRIPTION OF THE DRAWINGS

FIG. 1 is a side view of a case clamp for a four inch PVC tube. The stainless steel worm gear clamp 6 has been cut to a length approximately one inch longer than the circumference of the tubular case. The tubular webbing 7 has been cut to a length approximately three-eights inch shorter than the length of the stainless steel worm gear clamp 6 and has been inserted over the stainless steel worm gear clamp 6 to serve as sheathing. (This tubular nylon webbing arrives from the manufacturer rolled flat onto a spool. Although tubular, it looks like a miniature fire hose in that it lays perfectly flat until expanded. In this particular case, it matches the width of the flat stainless steel worm gear clamp 6 and thus, retains the flat profile.) Beneath the worm gear housing 6 lies an exposed foot of the worm gear mechanism to the right and a foot covered with the tubular nylon webbing 7 to the left. The tubular nylon webbing 7 has some stretch characteristic at any end point and, consequently, when fitted flush to the worm gear housing 6 as shown here under the hexagonal drive head, it slightly flares around the foot of the mechanism. To complete the case clamp, the exposed end of the stainless steel worm gear clamp 6 is inserted into the worm gear housing 6 and, as the drive mechanism is tightened, the tubular nylon webbing 7 expands around the combined foot of the mechanism 6 and the exposed or tag end of the stainless steel 7 as shown in FIG. 2, which illustrates a completed case clamp.

FIG. 3 is a frontal view of A type handle grip components. The top part 2 shows the proportions of a five and one-half inch length of five-eighths inch diameter yellow polypropylene braided rope. (This particular rope arrives from the manufacturer wound onto a spool; for this or perhaps other manufacturing reasons the rope is slightly compressed. In this drawing, the frontal view shows the compressed side.) The rope 2 has been cut to length and then seared with a hot soldiering iron to prevent it from fraying. The bottom part of the drawing 1 is proportional to a nine inch length of one inch tubular nylon. This material arrives from the manufacturer wound around a spool and lies flat, as in FIG. 1.

FIG. 4 is a frontal view of the completed A type handle grip. The braided rope 2 of FIG. 3 has been inserted into the one inch tubular nylon 1 in a manner that retains the same perspective, for both the tubular nylon 1 and braided rope 2, as shown in FIG. 3. The braided rope 2 has been centered lengthwise within the tubular nylon 1. The handle grip is finished by using a hot iron to melt a small—at least one-eighth inch wide—perpendicular surface.

FIG. 5 is a frontal view of the Balance Handle mounted on a PVC tube that shows the proportions of a three inch diameter tube. The two case clamps have been assembled as in FIG. 2 and slid onto the tubular case. Both ends of the handle grip as in FIG. 4 are wrapped over, down, then underneath the worm gear housing. A general rule for spacing the longitudinal distance between case clamps is to simply lower the handle grip—it is shown in the position it would be in during carry or up position—so that the place where the braided rope 2 ends within the tubular nylon 1 fits snugly around the worm gear housing. The Balance Handle would then be positioned and secured.

Figure 6:
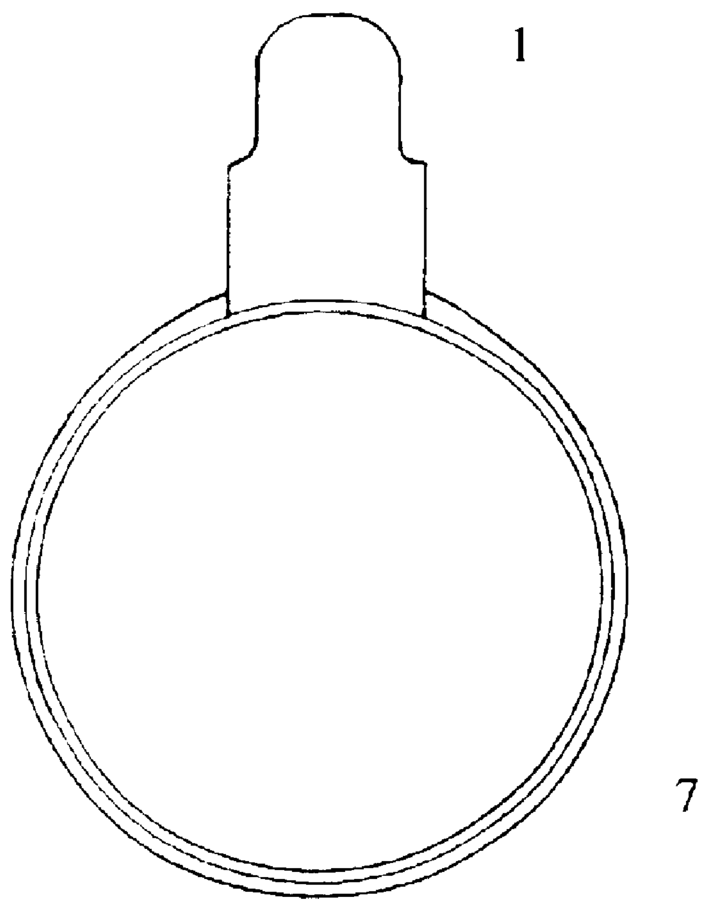
FIG. 6 is an end view of FIG. 5.

FIG. 6 is an end perspective of FIG. 5. The inner "ring" is the three inch PVC tube. FIG. 6 is added to help convey the shape the tubular nylon webbing 1 assumes when expanded by braided rope 2 then folded 180 degrees around the case clamp of FIG. 2.

FIG. 7 is a frontal view of the completed B type handle grip. The one inch tubular nylon webbing 3 is finished at the end points in the same manner as the A type handle grip end points as shown in FIG. 4, that is, with a hot soldiering iron to create a perpendicular surface at least one-eights inch wide.

FIG. 8 is a frontal view of B type handle grip components. At the top is the molded, non-marking rubber sleeve 5, the middle is a six inch section of five-eights inch diameter heavy rubber tubing 4; and at the bottom is a cut to length, ten inch length of one inch tubular nylon webbing 3. These three components arrive from the manufacturer assembled as shown in FIG. 7 (Except for the trimmed tubular nylon ends, which are explained in FIG. 4 and FIG. 7). All three components of FIG. 8 are thus shown in disassembled form. Once dissembled, a substitute length of one inch tubular webbing 3 may be used in the reassembly. Since the B type handle arrives from the manufacturer with black tubular nylon webbing 3, a substitute color, pattern, or weave may be used to create a custom product. For example, midnight blue may be used on the case clamps 7 and midnight blue 3 may be substituted for the standard black B type tubular nylon webbing 3. Moreover, the worm gear housing 6 may be anodized, powder coated or the like.

FIG. 9 is a frontal view of the Balance Handle mounted on a PVC tube that shows the proportions of a four inch diameter tube. This Balance Handle is assembled around the four inch tube as explained for FIG. 5. It is important to note that the one-eights inch perpendicular end surface in both FIG. 4 and FIG. 7 is wrapped under then aligned parallel and flush with the inside edge on the foot of the case clamp 6. This is important as the case clamp 6 will flex during carry if the case clamp as in FIG. 5 and FIG. 9 is under tightened. This very rarely occurs because the worm gear generates torque; it is much more likely to be over tightened than under tightened. However, in those instances where it is under tightened, load will transfer to the inside edge of foot (under the handle grip), and with the one-eights inch perpendicular melted surface located parallel to and flush with the inside edge of the foot, the handle grip will not pull out from under the case clamps.

Figure 10:
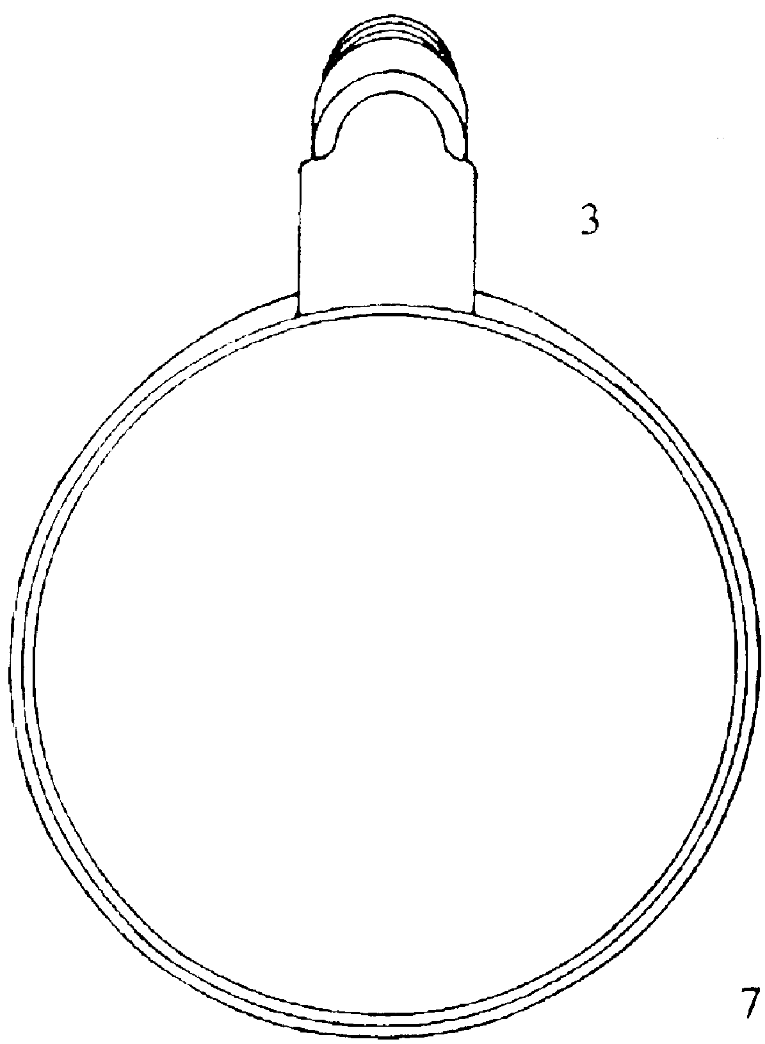
FIG. 10 is an end view of FIG. 9.

FIG. 10 is an end perspective of FIG. 9. It is shown for the same reason as in FIG. 6.

What is claimed is:

1. A Balance Handle for horizontal, one handed carry of a tubular case comprising:

five-eights inch braided rope approximately five and one-half inches long and approximately nine to ten inches of one inch tubular nylon webbing, with said braided rope inserted and centered within said tubular webbing forming handle grip A type, and alternately, approximately six inches of five-eights tubing inserted and centered within said tubular nylon webbing then covered with a molded, non-marking sleeve forming handle grip B type, with said tubular webbing having flat ends cut to length at least one and seven eights inches from said rope or said tubing, then melted squarely across the end forming a small T shape on said cut ends completing said handle grip A type and said handle grip B type, a stainless steel worm gear clamp of a length approximately one inch longer than a circumference of said tubular case consisting of a threaded strap with one end permanently joined to a worm gear housing and the other end cut to length, a second piece of tubular nylon webbing having a flattened interior width approximately equal to the width of said stainless steel worm gear clamp and a length slightly less than the circumference of said tubular case, with said second piece of flattened tubular webbing sheathing all except approximately three-eights inch of a tag end of the thread section of the said stainless steal worm gear clamp;

said sheathed threaded strap wrapped around the circumference of said tube with said tag end of said sheathed stainless steel worm gear clamp inserted into the worm gear, wherein turning said worm gear to engage said threads forms a case clamp;

Either of said type A or type B handle grips can be arranged parallel to and on top of said tubular case with each end of said handle grip resting between said tubular case and said case clamps worm gear housing to form said Balance Handle;

wherein said Balance Handle is positioned such that it is centered on a longitudinal weight fulcrum of said tubular case; and wherein said Balance Handle is secured in place by tightening said case clamps with a screwdriver, coin, five-sixteenth inch wrench, or an attachment to form a lever adjustment, removable or permanently attached; and wherein said Balance Handle is repositioned to a different weight fulcrum of the tube in a smooth, steady motion with sufficient tension to hold either handle grip A type or handle grip B type in proper position underneath the worm gear clamp.

2. The balance handle according to claim 1, wherein each end part of said tubular webbing of said handle grip A which is not occupied by said braided rope to be of sufficient length to not only fit under said case clamp, but to also be of sufficient length to wrap up and over said stainless steel worm gear clamp housing.

3. The balance handle according to claim 1, wherein each end of said tubular webbing for said handle grips is melted perpendicular to the length of said tubular webbing forming a T shape at least one-eights of an inch wide across the end of said tubular webbing or may be cut at varying lengths longer and sewn to secure then ends.

4. The balance handle according to claim 1, wherein all of said nylon tubular webbing can be of different colors or patterns which coordinate with the color or pattern of said tubular case and said type B handle grip can be altered by said color or pattern by disassembly of the six inch section of tubing, ten inch length of tubular nylon webbing, and molded, non-marking sleeve, and reassembly with a different ten inch length of said tubular webbing.

5. The balance handle according to claim 4, wherein said different tubular webbing may be of a heavier or stronger weave than said tubular webbing.

6. The balance handle according to claim 1, wherein said grip B can be made at least partially of rubber, leather, or synthetic composite.

7. The balance handle according to claim 1, wherein said case clamps can be altered by any manufacturing process for color or texture applied to said stainless steel worm gear clamps or by replacing said tubular nylon sheathing with rubber, leather or synthetic material to serve as alternate forms of said tubular nylon sheathing.

* * * * *